United States Patent [19]

Dean, II

[11] Patent Number: 4,642,661

[45] Date of Patent: Feb. 10, 1987

[54] PRINTER WITH DRIVE ON SWINGING PLATFORM

[75] Inventor: Walter C. Dean, II, Simsbury, Conn.

[73] Assignee: KCR Technology, Inc., East Hartford, Conn.

[21] Appl. No.: 794,620

[22] Filed: Nov. 4, 1985

[51] Int. Cl.[4] .............................................. G01D 15/28

[52] U.S. Cl. ................................. 346/153.1; 346/145; 400/616.2

[58] Field of Search ..................... 346/153.1, 136, 145; 400/DIG. 2; 226/170-172, 74

[56] References Cited

U.S. PATENT DOCUMENTS

| | | | |
|---|---|---|---|
| 4,426,653 | 1/1984 | Komada | 346/153.1 |
| 4,440,516 | 4/1984 | Rosenthal et al. | 400/616.2 |

*Primary Examiner*—Arthur G. Evans

*Attorney, Agent, or Firm*—Hayes & Reinsmith

[57] ABSTRACT

This invention discloses a swinging paper feed path platform pivotally mounted on a main frame of an electrographic printer apparatus for swinging movement between an operative position and an inoperative position about a pivot axis established by a driving shaft of a bidirectional tractor drive which is continuously engaged with the paper being fed through the apparatus regardless of the positioning of the swinging platform.

16 Claims, 5 Drawing Figures

PRINTER WITH DRIVE ON SWINGING PLATFORM

FIELD OF THE INVENTION

This invention relates to printing machines and is more particularly directed to high speed electrographic printing apparatus.

BACKGROUND OF THE INVENTION

This invention is used in conjunction with basic elements of known printing machines wherein an electrostatic charge is created for transmission of an image to paper. Known transfer process apparatus conventionally incorporate complex paper paths utilizing multiple paper drive assemblies to move the paper into, through and out of the apparatus. The complexity of such paper paths normally creates difficulty both in loading paper and in clearing jams.

OBJECTS OF THE INVENTION

An object of the present invention is to provide a mechanism that ensures ready access to all areas of the paper path. A related aim is to provide such access without disengaging the paper drive means from the paper.

Another object of the present invention is to provide a mechanism for use with high speed electrographic printing apparatus wherein use is made of common image production and transfer elements of standard printing apparatus in a significantly improved combination to provide a comparatively low cost versatile machine for general commercial use.

Other objects will in part be obvious and in part pointed out more in detail hereinafter.

SUMMARY OF THE INVENTION

Unlike such known printing apparatus, the present invention provides a mechanism for use with high speed electrographic printing apparatus which defines a simplified and easily accessible paper path with improved paper control. Moreover, the present invention provides for improved paper feeding and movement and clearing of paper jams by utilizing a swinging platform pivotally mounted on a frame of the printing apparatus to support selected print processing devices and to allow swing-up access to all areas of the paper path.

A better understanding of the objects, advantages, features, properties and relations of the invention will be obtained from the following detailed description and accompanying drawings which set forth an illustrative embodiment and are indicative of the way in which the principle of the invention is employed.

DESCRIPTION OF THE EMBODIMENTS

Figure 1:
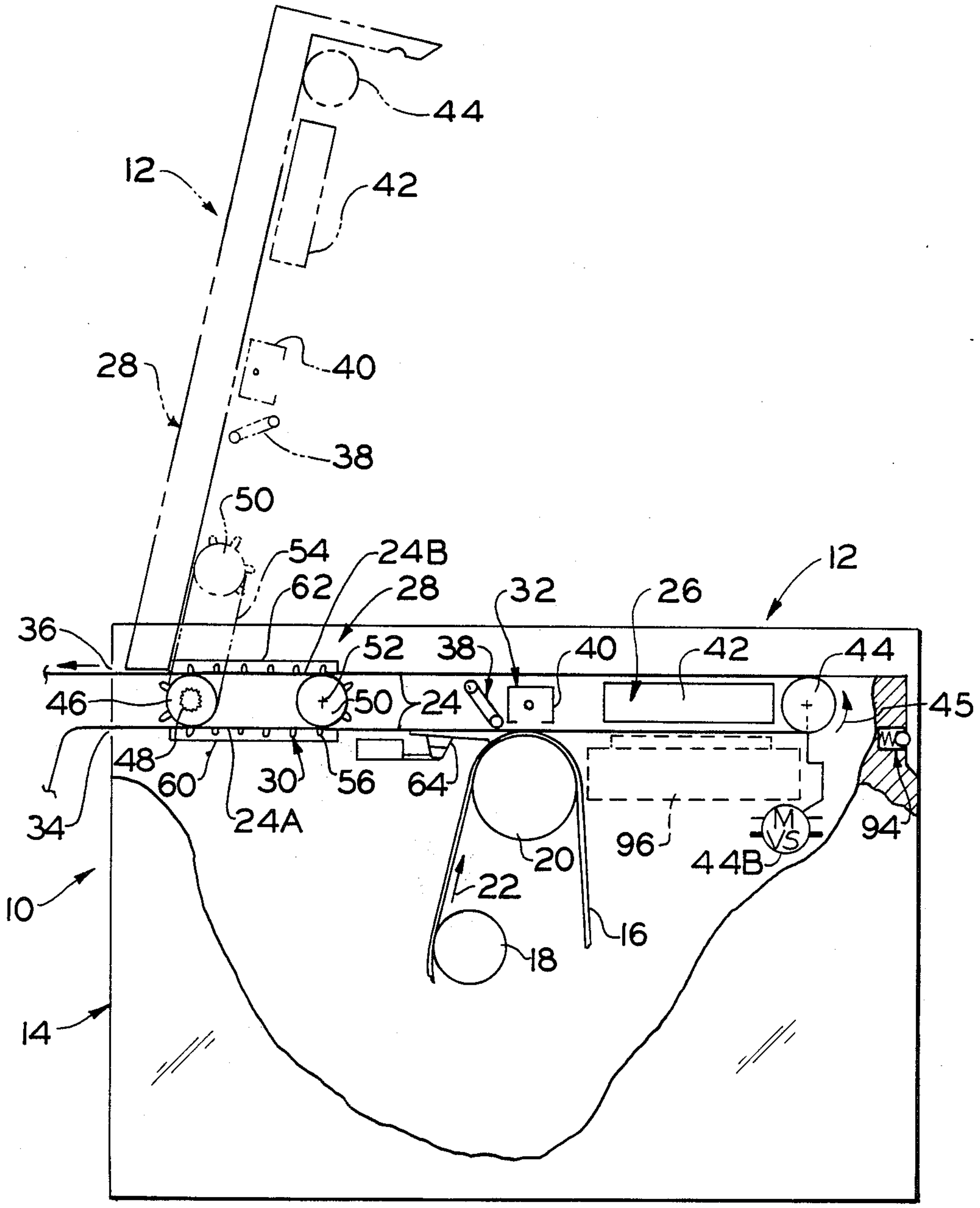
FIG. 1 is a schematic illustration, partly broken away and partly in section, wherein solid block lines illustrate the mechanism of this invention in an operative printing position, and wherein broken lines illustrate the mechanism in an inoperative position.

Referring now to the drawings in detail, a printing apparatus 10 is shown in FIG. 1 incorporating a mechanism 12 of the present invention. Apparatus 10 includes a frame 14 which houses certain printing components such as a dielectric member in the form of an endless belt 16 which will be understood to be supported by suitable roller cylinders such as illustrated at 18 and 20 and which is driven by a conventional power operated drive, not shown, to move belt 16 along a predetermined path indicated by arrow 22. The belt 16 may be formed from a suitable plastic such as polyester having a metallized or other conductive coating below a thin surface dielectric layer, whereby the belt 16 is susceptible of receiving and retaining a significant electrostatic charge. The general apparatus 10 with which the present invention is used is believed to be well known in the prior art. The dielectric belt 16 is arranged and supported in an endless tensioned loop. The belt 16 is continuously cleaned and conditioned for re-use as it approaches a print head which modifies the electrostatic charge on belt 16 to form a latent image in the desired pattern which is subsequently developed with a toner. The toned image is transferred to paper 24, and fixed such as by application of heat at a fusing station 26. The print head effects direct charge deposition on the dielectric member 16 and is fully described in copending patent application Ser. No. 794,640 entitled "ELECTROGRAPHIC CHARGE DEPOSITION APPARATUS" (and assigned to the assignee of this invention).

Positioned on frame 14 is a paper feed path platform 28, which supports print processing devices such as a paper drive means 30, an image transfer station 32, and an image fixation means at the fusing station 26 for the transfer and fixation of image onto paper 24.

Figure 5:
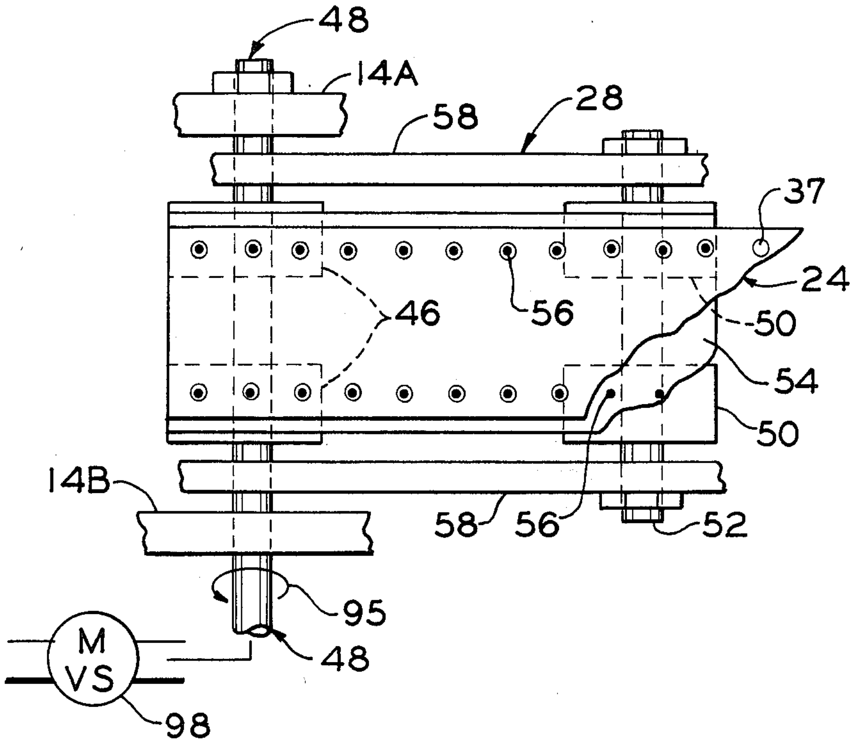
FIG. 5 is a top view, partly broken away, of the tractor drive used in this invention.

To provide a significantly simplified paper feed path platform 28 capable of providing extremely high operating speeds, platform 28 defines a reversely looped or bidirectional paper path for driving continuous paper 24 from a paper inlet opening 34 to paper outlet opening 36, both located on the same side of frame 14 in adjacent side-by-side relationship. These openings can also be combined into a single inlet/outlet opening. The continuous paper 24 used in the mechanism 12 will be understood to have perforated marginal edges (such as shown by the hole 37 in FIG. 5) and may be supplied from a box (not shown) in folded form to be pulled through paper inlet opening 34 in synchronism with dielectric belt movement by paper drive means 30.

In this invention, the paper drive means 30 comprises a bidirectional tractor drive which will be seen to be particularly suited to minimize the number of drive components while yet maintaining a high degree of positive control over the paper 24 being fed through the apparatus 10. In addition, platform 28 serves as a frame for mounting a wrap-control roller assembly 38, a transfer corona 40, a heat fuser 42 at the fusing station 26, and a turn-around or tension roller 44 to support paper 24 and reverse its direction of travel (indicated by arrow 45 in FIG. 1) as it passes through its bidirectional paper path.

Bidirectional tractor drive 30 controls the movement of paper 24 and applies a synchronized movement to first and second courses such as at 24A and 24B respectively of the paper 24 which are simultaneously engaged by tractor drive 30 to move paper 24 in generally opposite parallel directions of movement. More specifically and with reference to FIGS. 1 and 5, tractor drive 30 includes a first pair of rollers such as shown at 46 fixed or splined to a power operated drive shaft 48, and a second pair of rollers such as shown at 50 supported on axle 52. The second pair of rollers 50 are downstream of the first pair of rollers 46. Both roller pairs 46 and 50 jointly cooperate to support an endless belt 54 having paper engaging teeth 56 projecting from belt 54 through perforations 37 in the edges of paper 24 for maintaining engagement with the first and second courses 24A and 24B of paper 24. Both the drive shaft 48 and axle 52 are disposed transversely of the paper path in parallel relation and are suitably supported for rotation on side walls 58, 58 of platform 28.

Accordingly, paper 24 is fed by the tractor drive 30 into apparatus 10 and along the lower course of the bidirectional path and is pulled around tension control roller 44 and then directed out of apparatus 10. Cover plates 60 and 62 (FIG. 1) may also be secured on platform 28 parallel to and adjacent belt 54 for ensuring proper engagement of tractor drive teeth 56 with the first and second courses 24A and 24B of paper 24. It will be understood that the specifically described construction of tractor drive 30 of this invention can be modified in its structural details.

Upon being fed into the apparatus 10, paper 24 is guided by tractor drive 30 along the paper feed path past wrap control roller 38 to a transfer point. Roller 38 holds paper 24 in contact with the image belt 16 of the printer during the image transfer process at the transfer corona 40 to transfer the toner image appearing on the electrostatic belt 16 to paper 24. Roller 38 is lifted up along with paper 24 by a paperlift arm 64 mounted on frame 14 when the paper movement stops to allow continued image belt movement without smearing the transferred image. Thereafter, paper 24 leaves the transfer point and continues along its bidirectional paper path to fuser 42 which fixes the image of paper 24 before it is delivered from apparatus 10.

Figure 2:
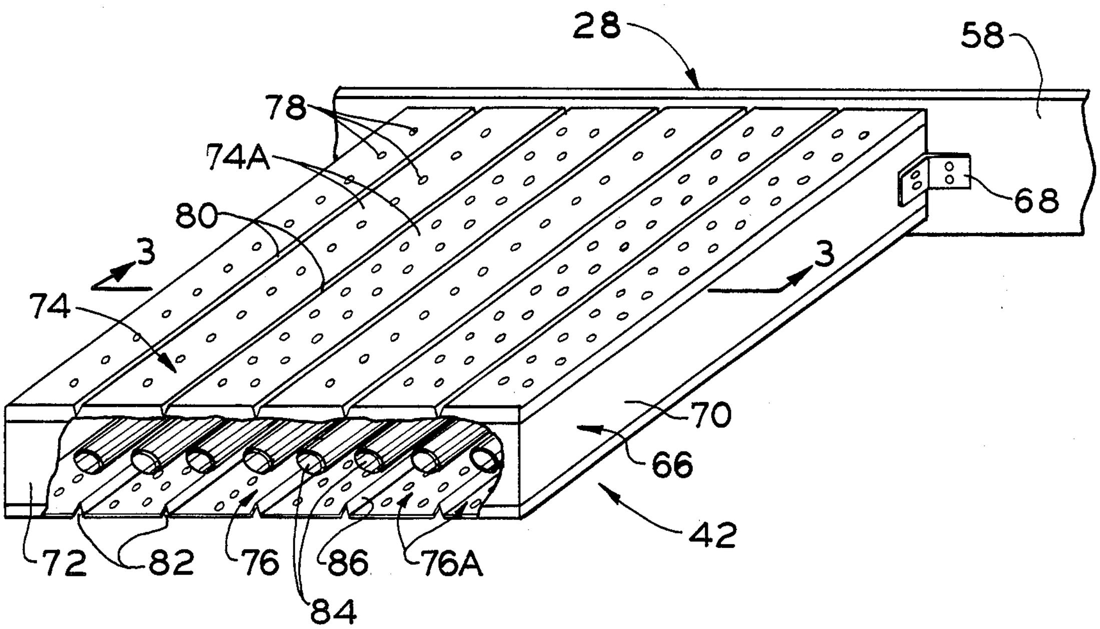
FIG. 2 is an isometric view, partly broken away and partly in section, of a heat fuser used in this invention.
Figure 3:
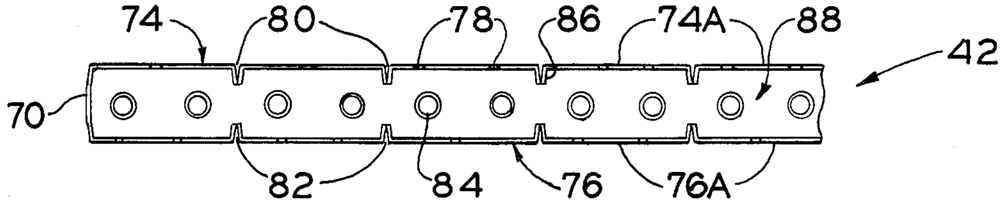
FIG. 3 is a cross sectional view taken generally along line 3—3 of FIG. 2.

Heat fuser 42 (FIGS. 1-3) comprises a boxlike housing 66 secured by any suitable means such as bracket 68 to the side walls such as at 58 of platform 28. Housing 66 itself is closed by opposite pairs of end and side walls such as at 70 and 72, respectively, with top and bottom panels 74, 76 having a multiplicity of perforations such as at 78 uniformly formed therein. The top and bottom panels 74, 76 are shown as being formed of a plurality of individual plates 74A, 76A respectively in contact with one another at edges 80, 82. Fuser 42 encloses a series of heat lamps 84 that provide heat to plates 74A, 76A through radiant heat transfer. A temperature sensor (not shown) is preferably mounted within fuser 42 to provide a signal for temperature control by varying the on/off duty cycle of the lamps 84. The disclosed double sided heat transfer fuser construction makes effective use of all the radiant energy from heat lamps 84 without requiring reflectors, and the plates 74A, 76A are supported on their opposite lateral edges by the housing side walls such as at 72 to allow unrestricted expansion and to avoid plate buckling. Stiffening ribs 86 are formed along the length of individual plates 74A, 76A and run parallel to the heating lamps 84 to reduce the formation of hot spots.

To effect virtual contact engagement of paper 24 with panels 74 and 76 of fuser 42 for quality fusing of the image to paper 24, a differential pressure is applied by a suction blower, not shown, which is connected to chamber 88 within fuser 42. The perforations 78 in plates 74A, 76A assure that suction is applied uniformly to in turn provide uniform heating of paper 24 as it passes each panel 74, 76 of fuser 42 in the bidirectional paper path which will be seen to provide yet another significant advantage in maximizing the fusing capability of apparatus 10 by virtue of two passes of paper 24 over a single fuser 42. An additional noteworthy advantage of the disclosed construction is that the vacuum also removes undesired vapors from the fusion process.

Figure 4:
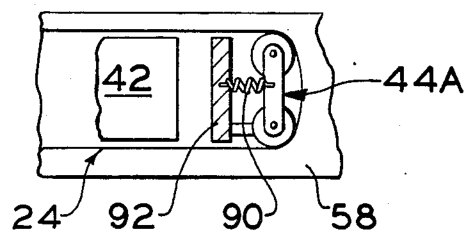
FIG. 4 is a side view, partly in section and partly broken away, showing another embodiment of a tension roller used in this invention.

Reversal in direction of the path of paper movement is effected by training paper around turn-around roller assembly 44A rotably mounted on a side wall 58 of platform 28. If desired, this roller assembly 44A can be spring loaded (FIG. 4) to continuously urge paper 24 in a direction away from heat fuser 42, thereby to tension paper 24 under the biasing force of a tension spring 90 having opposite ends fixed between roller assembly 44A and a plate 92 extending between side walls 58 of platform 28.

Yet another construction contemplated by this invention is the provision of a powered drive (FIG. 1) to rotate roller 44 for reducing the load on tractor drive 30 by pulling paper 24 and eliminating roller tracking forces caused by any frictional resistance to relative sliding between roller 44 and paper 24. This disclosed power assist is provided by a variable speed motor 44B suitably drivingly connected to roller 44 in any conventional manner. By virtue of such construction, undesired paper skewing forces (introduced by imperfections in the surface of roller 44) are effectively counteracted and the integrity of paper perforations 37 (FIG. 5) is maintained to ensure proper stacking of the printed papers at the output of apparatus 10. In the preferred embodiment, powered roller 44 is driven at a speed slightly greater than the speed of paper 24. By powering roller 44 as described, improved paper control is attained by readily overcoming both the friction between paper 24 and lower plates 76A and also the peel forces encountered by any electrostatic bond between paper 24 and image belt 16.

In accordance with yet another feature of this invention, platform 28 is supported in its entirety for swinging movement on frame 14 about drive shaft 48 to tractor drive 30. This drive shaft 48 will be understood to be suitably supported for rotation (as indicated by arrow 95 in FIG. 5) on opposite side walls 14A and 14B of frame 14 with platform 28 pivotally mounted on that shaft 48. By virture of such construction, the above described components such as tractor drive 30, the wrap-control roller 38, the transfer corona 40, the heat fuser 42 and tension roller 44 are all operatively mounted on swinging platform 28 and may be pivoted in unison about shaft 48. In the illustrated embodiment, platform 28 and its associated components pivot between an operative position (shown in full lines in FIG. 1) wherein platform 28 is supported in a generally horizontal position on top of frame 14, and a raised inoperative position (shown in broken lines in FIG. 1).

By such construction, the paper path is effectively mounted to the printer frame 14 at a single pivot point concentric with the tractor drive shaft 48 so that the paper drive motor 98 (FIG. 5) can be mounted on printer frame 14 and not on the movable paper path platform 28. This allows the front corner of the paper path to be cantilevered or unsupported so that paper loading can be accomplished without threading. The operator simply pulls paper 24 directly from a box on the floor, i.e., at the machine input side and without releasing the paper, moves his hand under the tractor drive 30 around the end of fuser 42, and back over the tractor drive 30 in a single uninterrupted motion. After the bottom or input side tractor cover plate 60 is closed on paper 24, platform 28 is lowered and the top or output side tractor cover plate 62 is closed, locking in the proper paper tension as set by the operator. A latch 94 may be provided to hold platform 28 closed and also to serve to precisely locate platform 28 with respect to image belt 16. The fuser 42 engages a vacuum plenum 96 mounted within frame 42 as the swing-up platform 28 is closed so that communication is established between plenum 96 and the fuser chamber 88. It will be noted that with this construction, the suction blower need not move with the platform 28, but rather may be conveniently mounted on frame 14 as is the paper drive motor 98.

It is therefore seen that the present invention uniquely arranges paper path and printing components on a swinging paper feed path platform to provide easy access to the paper path for loading and clearing of jams in addition to the ready feed of paper into the apparatus while maintaining high speed electrographic reproduction of images.

As will be apparent to those persons skilled in the art various modifications, adaptations and variations of the foregoing specific disclosure can be made without departing from the teachings of the present invention.

I claim:

1. For use in a printer for printing a continuous length of paper having a perforated marginal edge, a mechanism comprising a frame, a swinging platform mounted for pivoting movement on the frame, and a bidirectional tractor drive mounted on the platform and engageable with the perforated marginal edge of the paper for driving the paper, the platform being pivotable between an operative printing position and an inoperative position, the platform in its operative printing position cooperating with the frame in defining a bidirectional paper feed path wherein the paper is fed along said path with first and second paper courses moving in generally opposite directions of travel, the first and second paper courses each being in engagement with the tractor drive, the platform in its inoperative position being in remote relation to the frame to facilitate paper loading and to provide ready access to the paper feed path, and the bidirectional tractor drive having a power operated drive shaft rotatably supported by the frame and defining a pivot axis for the swinging platform.

2. The mechanism of claim 1 further including a roller journalled on the platform for engaging the paper and reversing its direction of travel.

3. The mechanism of claim 2 wherein the roller is spring biased to continuously apply tension to the paper.

4. The mechanism of claim 2 wherein the roller is free-wheeling.

5. The mechanism of claim 2 wherein the roller is power operated for positively driving the paper.

6. The mechanism of claim 5 further including a variable speed motor drivingly connected to rotate the roller at a speed slightly greater than the paper speed.

7. The mechanism of claim 1 further including a releasable latch for securing the platform in its operative position in locked engagement with the frame.

8. For use in a printer for printing a continuous length of paper having a perforated marginal edge, a mechanism comprising a frame, means defining an image bearing surface mounted on the frame and serving as a carrier for toner particles, a swinging platform mounted for pivoting movement on the frame, a transfer corona mounted on the platform for effecting toner particle movement from the image bearing surface of the paper, and a bidirectional tractor drive mounted on the platform and engageable with the perforated marginal edge of the paper for driving the paper, the platform being pivotable between an operative printing position and an inoperative position, the platform in its operative printing position cooperating with the frame in defining a bidirectional paper feed path wherein the paper is fed along said path with first and second paper courses moving in generally opposite directions of travel, the first and second paper courses each being in engagement with the tractor drive, the platform in its inoperative position being in remote relation to the frame to facilitate paper loading and to provide ready access to the paper feed path, and the bidirectional tractor drive having a power operated drive shaft rotatably supported by the frame and defining a pivot axis for the swinging platform.

9. The mechanism of claim 8 further including a releasable latch for securing the platform in its operative position in locked engagement with the frame, the latch securing the platform mounted transfer corona in precision alignment relative to the image hearing surface.

10. The mechanism of claim 8 further including a heat fuser mounted on the platform downstream of the transfer corona for fusing toner particles to paper.

11. The mechanism of claim 10 wherein the heat fuser includes a vacuum chamber defined in part by a perforated plate engageable with the paper.

12. The mechanism of claim 10 wherein vacuum means including a plenum is mounted on the frame, the vacuum plenum communicating with the vacuum chamber of the heat fuser when the platform is in its operative position.

13. The mechanism of claim 10 wherein the heat fuser includes a vacuum chamber with first and second perforated plates respectively engagable with the first and second courses of the paper.

14. The mechanism of claim 8 further including a paper control roller journalled on the platform adjacent the transfer corona for controlling the paper position.

15. The mechanism of claim 14 further including a paper lift device cooperating with the paper control roller for selectively disengaging the paper from the image bearing surface during stoppage of paper movement.

16. The mechanism of claim 8 wherein said means defining an image bearing surface is an image belt.

* * * * *